United States Patent
Tomoshige et al.

(12) 
(10) Patent No.: US 9,350,030 B2
(45) Date of Patent: May 24, 2016

(54) FUEL CELL MODULE

(71) Applicants: MURATA MANUFACTURING CO., LTD., Kyoto-Fu (JP); Tokyo Gas Co., Ltd., Minato-Ku (JP)

(72) Inventors: Yosuke Tomoshige, Nagaokakyo (JP); Kimihiro Mizukami, Nagaokakyo (JP); Masato Inaoka, Nagaokakyo (JP); Hideki Yoshida, Minato-Ku (JP); Kei Ogasawara, Minato-Ku (JP); Shinji Amaha, Minato-Ku (JP)

(73) Assignees: MURATA MANUFACTURING CO., LTD., Nagaokakyo-Shi, Kyoto-Fu (JP); TOKYO GAS CO., LTD., Minato-Ku, Tokyo (JP)

( * ) Notice: Subject to any disclaimer, the term of this patent is extended or adjusted under 35 U.S.C. 154(b) by 75 days.

(21) Appl. No.: 14/094,457

(22) Filed: Dec. 2, 2013

(65) Prior Publication Data

US 2014/0186736 A1    Jul. 3, 2014

Related U.S. Application Data

(63) Continuation of application No. PCT/JP2012/063899, filed on May 30, 2012.

(30) Foreign Application Priority Data

Jun. 3, 2011   (JP) ................................. 2011-124930

(51) Int. Cl.
        H01M 8/04         (2006.01)
        H01M 8/24         (2016.01)
        H01M 8/12         (2016.01)

(52) U.S. Cl.
        CPC ...... *H01M 8/04022* (2013.01); *H01M 8/04082* (2013.01); *H01M 8/249* (2013.01); *H01M 2008/1293* (2013.01); *Y02E 60/50* (2013.01); *Y02E 60/525* (2013.01)

(58) Field of Classification Search
        CPC ............ H01M 8/249; H01M 8/04082; H01M 8/04022; H01M 2008/1293
        See application file for complete search history.

(56) References Cited

U.S. PATENT DOCUMENTS

| 2009/0233130 | A1  | 9/2009 | Hirata et al. |
| 2010/0116576 | A1  | 5/2010 | Jufuku et al. |
| 2011/0053027 | A1* | 3/2011 | Weingaertner et al. ........ 429/440 |

FOREIGN PATENT DOCUMENTS

| CN | 101771161 A | 7/2010 |
| JP | 3005970 U   | 1/1995 |

(Continued)

OTHER PUBLICATIONS

PCT/JP2012/063899, International Search Report, date of mailing Jul. 3, 2012.

(Continued)

*Primary Examiner* — Muhammad Siddiquee
(74) *Attorney, Agent, or Firm* — Arent Fox LLP

(57) ABSTRACT

Provided is a solid oxide fuel cell module that is small in size and is capable of stably generating power. A plurality of power generation units and are located such that a first fuel cell and an oxidant gas preheater connected to a second fuel cell adjacent to the first fuel cell are adjacent to each other. A solid oxide fuel cell module includes a partition member. The partition member partitions a combustion chamber into a region including the first fuel cell and a region including the second fuel cell as well as into the region including the first fuel cell and a region including the oxidant gas preheater connected to the second fuel cell.

8 Claims, 2 Drawing Sheets

(56) References Cited

FOREIGN PATENT DOCUMENTS

| | | | |
|---|---|---|---|
| JP | 2002-313375 A | 10/2002 |
| JP | 2004-319462 A | 11/2004 |
| JP | 2006-86053 A | 3/2006 |
| JP | 2006-127908 A | 5/2006 |
| JP | 2006-331881 A | 12/2006 |
| JP | 2007-157479 A | 6/2007 |
| JP | 2008-198423 A | 8/2008 |
| JP | 2008-251495 A | 10/2008 |
| JP | 2008-279954 A | 11/2008 |
| JP | 2009-170170 A | 7/2009 |
| JP | 2010-212038 A | 9/2010 |
| JP | 2010-238433 A | 10/2010 |

OTHER PUBLICATIONS

Notice of Ground of Rejection, Patent Application No. 2011-124930; Date of draft: Jul. 4, 2013, Japanese Patent Office, date of Mailing Jul. 9, 2013, Ref. DP110268.

PCT/JP2012/063899, PCT International Preliminary Report on patentability, date of mailing Dec. 19, 2013.

PCT/JP2012/063899 Written Opinion of the International Searching Authority, date of mailing Jul. 3, 2012.

* cited by examiner

FUEL CELL MODULE

PRIOR ART DOCUMENT

Patent Document

Patent Document 1: JP 2010-212038

SUMMARY OF THE INVENTION

Problems to be Solved by the Invention

It is desired to reduce variation in temperature of the fuel cell so as to stably activate the solid oxide fuel cell module. Reduction in size is also demanded for the solid oxide fuel cell module.

The present invention has been made in view of these points, and it is an object thereof to provide a solid oxide fuel cell module that is small in size and is capable of stably generating power.

Means for Solving the Problems

A fuel cell module according to the present invention includes a combustion chamber and a plurality of power generation units. The plurality of power generation units each include a fuel cell, a fuel gas channel, an oxidant gas channel, and an oxidant gas preheater. The fuel cell is located in the combustion chamber. The fuel cell is supplied with fuel gas and oxidant gas to generate power. The fuel gas channel supplies the fuel cell with the fuel gas. The oxidant gas channel supplies the fuel cell with the oxidant gas. The oxidant gas preheater is provided in the oxidant gas channel in the combustion chamber. The oxidant gas preheater preheats the oxidant gas. A plurality of power generation units are located such that first one of the fuel cells and the oxidant gas preheater connect to second one of the fuel cells adjacent to the first one of the fuel cells which are adjacent to each other. The fuel cell module according to the present invention further includes a partition member. The partition member partitions the combustion chamber into a region including the first one of the fuel cells and a region including the second one of the fuel cells, and into the region including the first one of the fuel cells and a region including the oxidant gas preheater disconnected to the second one of the fuel cells.

In the fuel cell module according to a particular aspect of the present invention, the plurality of power generation units include first and second power generation units. The fuel cell of the first power generation unit is located on one side in a first direction with respect to the fuel cell of the second power generation unit. The fuel cell of the first power generation unit and the oxidant gas preheater of the second power generation unit are adjacent to each other in a second direction perpendicular to the first direction. The fuel cell of the second power generation unit and the oxidant gas preheater of the first power generation unit are adjacent to each other in the second direction.

In the fuel cell module according to another particular aspect of the present invention, the fuel cell of the first power generation unit and the fuel cell of the second power generation unit are located so as to overlap with each other when viewed in the first direction.

In the fuel cell module according to still another particular aspect of the present invention, the partition member is made of a heat insulator.

In the fuel cell module according to still another particular aspect of the present invention, the fuel cell has a first exhaust port and a second exhaust port. The first exhaust port discharges air electrode exhaust gas that is oxidant gas already used for power generation. The second exhaust port discharges fuel electrode exhaust gas that is fuel gas already used for power generation. The combustion chamber has an exhaust opening and an exhaust channel. The exhaust opening discharges exhaust gas discharged from the fuel cell to an outside of the combustion chamber. The exhaust channel connects the first and second exhaust ports and the exhaust openings. The exhaust channel is provided such that at least part of the oxidant gas preheater is located above the exhaust channel or faces the exhaust channel.

Effects of the Invention

According to the present invention, it is possible to provide a solid oxide fuel cell module that is small in size and is capable of stably generating power.

MODE FOR CARRYING OUT THE INVENTION

Figure 1:
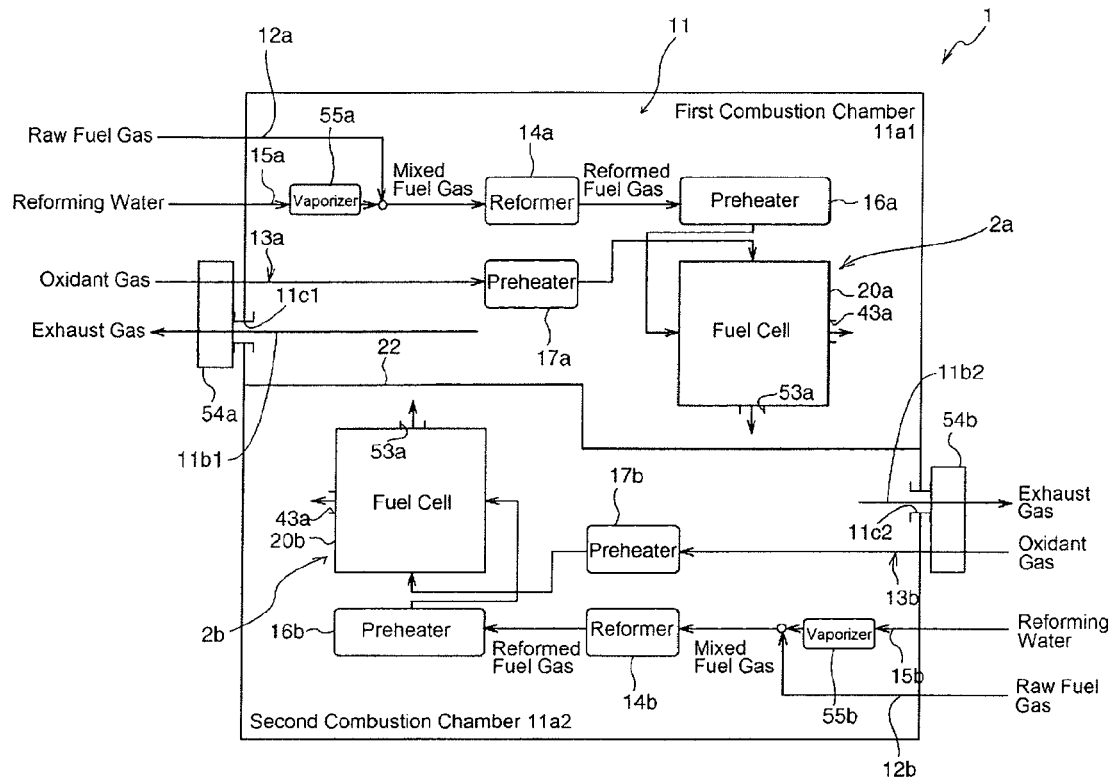
FIG. 1 is a rough block diagram of a solid oxide fuel cell module according to an embodiment of the present invention.

A preferred embodiment of the present invention is exemplified below. It is noted that the following embodiment is merely exemplification. The present invention should never be limited to the following embodiment.

In each of the drawings to be referred to in this embodiment and the like, members having substantially the same functions are to be denoted by the same reference symbols. The drawings to be referred to in the embodiment and the like are schematic, and size ratios and the like of objects depicted in the drawings may be different from size ratios and the like of actual objects. Size ratios and the like of such objects may be also different among the drawings. Size ratios and the like of specific objects should be determined in consideration of the following description.

Configuration of Solid Oxide Fuel Cell Module 1

Figure 2:
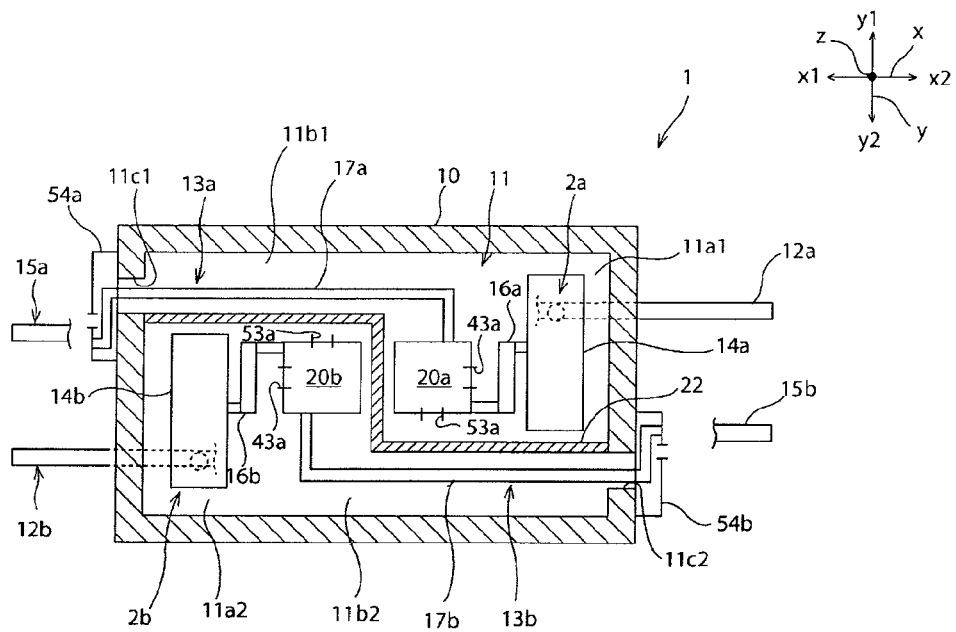
FIG. 2 is a schematic plan view of the solid oxide fuel cell module according to the embodiment of the present invention.

FIG. 1 is a rough block diagram of a solid oxide fuel cell module according to the present embodiment. FIG. 2 is a schematic plan view of the solid oxide fuel cell module according to the present embodiment.

A solid oxide fuel cell module (also referred to as a hot module) 1 includes a combustion chamber 11 surrounded with a heat insulator 10. The combustion chamber 11 accommodates a heater (not shown). This heater is capable of increasing temperature in the combustion chamber 11. The heater can be either an electric heater or a gas burner.

The solid oxide fuel cell module 1 further includes a plurality of power generation units. The present embodiment exemplifies a case where the solid oxide fuel cell module 1 includes first and second power generation units 2a and 2b.

The first and second power generation units 2a and 2b include fuel cells 20a and 20b, fuel gas channels 12a and 12b, oxidant gas channels 13a and 13b, and oxidant gas preheaters 17a and 17b, respectively. The fuel cells 20a and 20b are located in the combustion chamber 11. The fuel cells 20a and 20b generate power when being supplied with fuel gas and oxidant gas.

The fuel cells 20a and 20b are connected with the fuel gas channels 12a and 12b and the oxidant gas channels 13a and 13b. The fuel gas channels 12a and 12b supply fuel gas to the fuel cells 20a and 20b. The fuel gas channels 12a and 12b are at least partially located in the combustion chamber 11. The oxidant gas channels 13a and 13b supply oxidant gas to the fuel cells 20a and 20b. The oxidant gas channels 13a and 13b at least partially located in the combustion chamber 11.

The fuel gas channels 12a and 12b are provided therein with reformers 14a and 14b. The reformers 14a and 14b are located in the combustion chamber 11. As shown in FIG. 2, the reformer 14a of the first power generation unit 2a is located on an x2 side of the fuel cell 20a. The reformer 14b of the second power generation unit 2b is located on an x1 side of the fuel cell 20b.

At portions upstream of the reformers 14a and 14b in the fuel gas channels 12a and 12b (on the opposite sides of the fuel cells 20a and 20b in fuel gas flow directions), there are connected reforming water channels 15a and 15b for supplying reforming water. The reforming water channels 15a and 15b are at least partially located in the combustion chamber 11.

At portions downstream of the reformers 14a and 14b in the fuel gas channels 12a and 12b (on the sides of the fuel cells 20a and 20b in the fuel gas flow directions) in the combustion chamber 11, there are provided fuel gas preheaters 16a and 16b. As shown in FIG. 2, the fuel gas preheater 16a of the first power generation unit 2a is located on the x2 side of the fuel cell 20a. The fuel gas preheater 16a is located between the fuel cell 20a and the reformer 14a in the x direction. The fuel gas preheater 16b of the second power generation unit 2b is located on the x1 side of the fuel cell 20b. The fuel gas preheater 16b is located between the fuel cell 20b and the reformer 14b in the x direction.

The oxidant gas preheaters 17a and 17b are provided in the oxidant gas channels 13a and 13b in the combustion chamber 11. The oxidant gas preheaters 17a and 17b preheat oxidant gas supplied to the fuel cells 20a and 20b.

The combustion chamber 11 according to the present embodiment is partitioned by a partition member 22 into a first combustion chamber 11a1 and a second combustion chamber 11a2. The first power generation unit 2a is located in the first combustion chamber 11a1. The second power generation unit 2b is located in the second combustion chamber 11a2. The partition member 22 thus partitions into a region including the first power generation unit 2a in the combustion chamber 11 and a region including the second power generation unit 2b in the combustion chamber 11.

The partition member 22 is preferably made of a heat insulator. Specific examples of preferably used heat insulators include a ceramic fiber heat insulator, an alumina fiber heat insulator, zirconia system ceramics or bricks having low heat conductivity, a microporous heat insulator having excellent heat insulation performance sandwiched by bricks or ceramic plates. These heat insulators have at least a certain degree of strength.

Fuel Cells 20a and 20b

Figure 3:
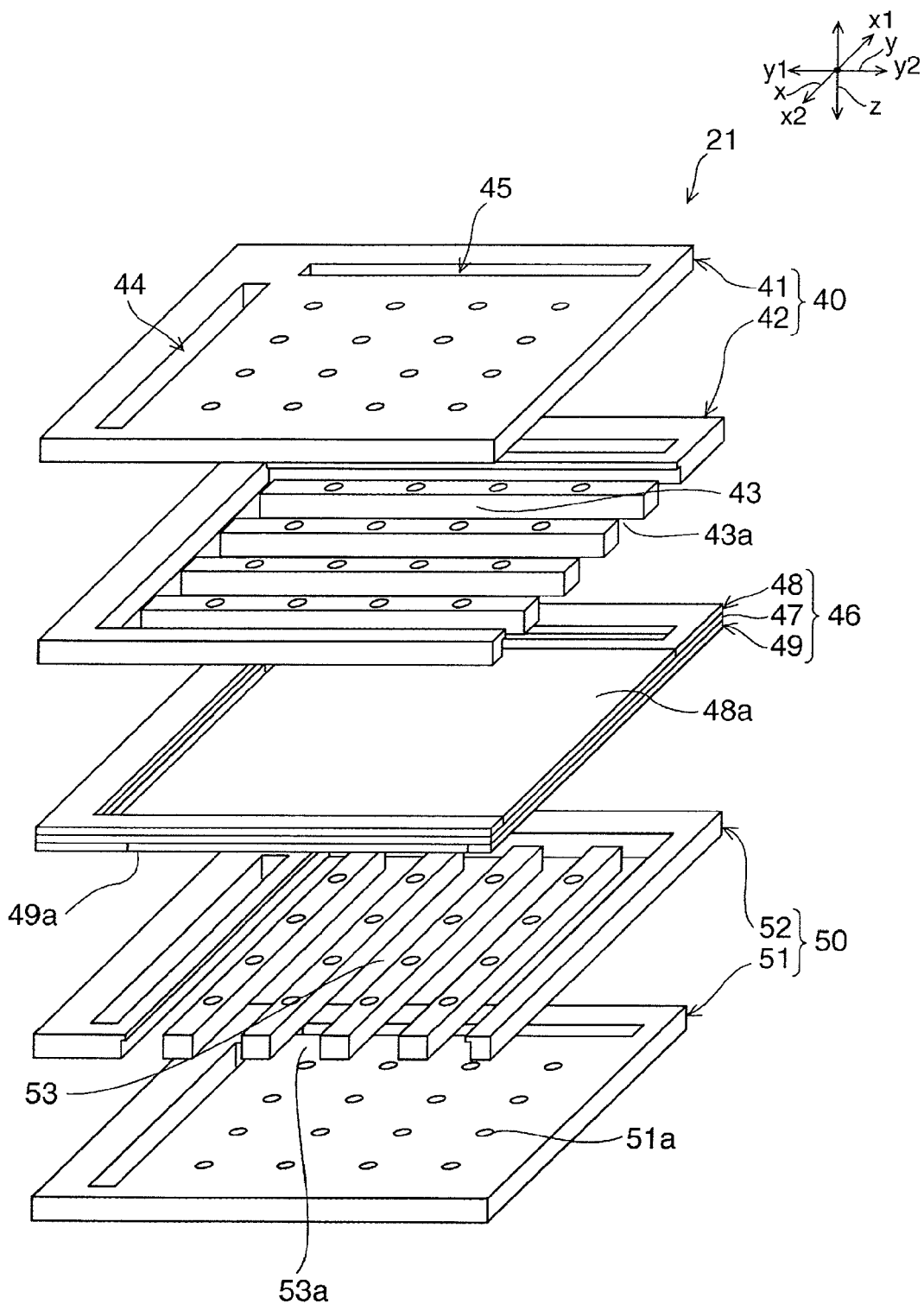
FIG. 3 is a rough exploded perspective view of a power generation cell of a fuel cell according to the embodiment of the present invention.

FIG. 3 is a rough exploded perspective view of a power generation cell of the fuel cell according to the present embodiment. The configurations of the fuel cells 20a and 20b are described next with reference to FIG. 3.

The fuel cells 20a and 20b include a single or a plurality of power generation cells 21. The power generation cell 21 includes a first separator 50, a power generation element 46, and a second separator 40. In the power generation cell 21, the first separator 50, the power generation element 46, and the second separator 40 are layered in this order. Each of the separators is provided with via hole electrodes 51a for extracting generated electricity. Above the uppermost separator and below the lowermost separator, there are provided power collecting rods (not shown), for collecting and extracting electricity.

The power generation cell 21 has an oxidant gas manifold 45 connected to the oxidant gas channel 13a or 13b and a fuel gas manifold 44 connected to the fuel gas channel 12a or 12b.

Power Generation Element 46

At the power generation element 46, oxidant gas supplied from the oxidant gas manifold 45 by way of the oxidant gas channel 13a or 13b and fuel supplied from the fuel gas manifold 44 by way of the fuel gas channel 12a or 12b react together to generate power.

(Solid Oxide Electrolyte Layer 47)

The power generation element 46 includes a solid oxide electrolyte layer 47. The solid oxide electrolyte layer 47 preferably has high ionic conductivity. The solid oxide electrolyte layer 47 can be made of stabilized zirconia, partially stabilized zirconia, or the like. Specific examples of stabilized zirconia include yttria stabilized zirconia (YSZ) and scandia stabilized zirconia (ScSZ), or the like. Specific examples of partially stabilized zirconia include yttria partially stabilized zirconia (YSZ) and scandia partially stabilized zirconia (ScSZ), or the like. The solid oxide electrolyte layer 47 can be alternatively made of, for example, a perovskite oxide such as $La_{0.8}Sr_{0.2}Ga_{0.8}Mg_{0.2}O_{(3-\delta)}$, which is obtained from a matrix of a seria-based oxide containing doped Sm, Gd, or the like, or $LaGaO_3$, by substituting part of La and Ga for Sr and Mg, respectively.

The solid oxide electrolyte layer 47 is sandwiched between an air electrode layer 49 and a fuel electrode layer 48. More specifically, the air electrode layer 49 is provided on a main surface of the solid oxide electrolyte layer 47, whereas the fuel electrode layer 48 is provided on another main surface thereof.

Air Electrode Layer 49

The air electrode layer 49 has an air electrode 49a. The air electrode 49a is a cathode. At the air electrode 49a, oxygen captures electrons to form oxygen ions. The air electrode 49a is preferred to be porous, have high electron conductivity, and be less likely to cause solid-solid reaction with the solid oxide electrolyte layer 47 or the like at high temperature. The air electrode 49a can be made of scandia stabilized zirconia (ScSZ), Sn doped indium oxide, a $PrCoO_3$ oxide, an $LaCoO_3$ oxide, an $LaMnO_3$ oxide, or the like. Specific examples of an $LaMnO_3$ oxide include $La_{0.8}Sr_{0.2}MnO_3$ (commonly known as LSM) and $La_{0.6}Ca_{0.4}MnO_3$ (commonly known as LCM), or the like. The air electrode 49a can be made of a mixture of at least two of the materials mentioned above.

Fuel Electrode Layer 48

The fuel electrode layer 48 has a fuel electrode 48a. The fuel electrode 48a is an anode. At the fuel electrode 48a, oxygen ions and fuel react together to discharge electrons. The fuel electrode 48a is preferred to be porous, have high ion conductivity, and be less likely to cause solid-solid reaction with the solid oxide electrolyte layer 47 or the like at high temperature. The fuel electrode 48a can be made of NiO, a porous cermet of yttria stabilized zirconia (YSZ) and nickel metal, a porous cermet of scandia stabilized zirconia (ScSZ) and nickel metal, or the like. The fuel electrode layer 48 can be alternatively made of a mixture of at least two of the materials mentioned above.

First Separator 50

The first separator 50, which includes a first separator main body 51 and a first channel forming member 52, is located below the air electrode layer 49 of the power generation element 46. The first separator 50 is provided with oxidant gas supply channels 53 for supplying the air electrode 49a with air. As shown in FIG. 3, the oxidant gas supply channels 53 extend from the x1 side to the x2 side in the x direction with respect to the oxidant gas manifold 45. The oxidant gas supply channels 53 have openings serving as a plurality of first exhaust ports 53a for discharging air electrode exhaust gas that is oxidant gas already used for power generation. As shown in FIG. 2, the first exhaust ports 53a are provided in side walls on the y2 side of the fuel cells 20a and 20b. The air electrode exhaust gas is thus discharged from the fuel cells 20a and 20b to the y2 side.

The first separator 50 is not particularly limited in terms of its material. The first separator 50 can be made of stabilized zirconia such as yttria stabilized zirconia, partially stabilized zirconia, or the like.

Second Separator 40

The second separator 40, which includes a second separator main body 41 and a second channel forming member 42, is located above the fuel electrode layer 48 of the power generation element 46. The second separator 40 is provided with fuel gas supply channels 43 for supplying the fuel electrode 48a with fuel. As shown in FIG. 3, the fuel gas supply channels 43 extend from the y1 side to the y2 side in the y direction with respect to the fuel gas manifold 44. The fuel gas supply channels 43 have openings serving as a plurality of second exhaust ports 43a for discharging fuel electrode exhaust gas that is fuel gas already used for power generation. As shown in FIG. 2, the second exhaust ports 43a are provided in side walls on the x2 side of the fuel cells 20a and 20b. The fuel electrode exhaust gas is thus discharged from the fuel cells 20a and 20b to the x2 side. In the present embodiment, fuel electrode exhaust gas is discharged in the direction obtained by positive rotation of 90 degrees from the direction of discharging air electrode exhaust gas.

The second separator 40 is not particularly limited in terms of its material. The second separator 40 can be made of stabilized zirconia, partially stabilized zirconia, or the like.

Exhaust Channel

As shown in FIG. 1, the combustion chamber 11 is provided with exhaust openings 11c1 and 11c2. More specifically, the exhaust opening 11c1 is provided to the first combustion chamber 11a1.

The exhaust opening 11c1 discharges exhaust gas including air electrode exhaust gas and fuel electrode exhaust gas discharged from the fuel cell 20a to the outside of the first combustion chamber 11a1. The exhaust gas discharged from the exhaust opening 11c1 passes through a combustion chamber external heat exchanger 54a, which is located outside the combustion chamber 11, and is discharged to the outside of the solid oxide fuel cell module 1.

As shown in FIG. 2, the exhaust opening 11c1 is provided in the inner surface on the x1 side of the first combustion chamber 11a1. The exhaust opening 11c1 is opened to the side opposite to the direction of discharging exhaust gas (the x1 side) at the second exhaust ports 43a of the fuel cell 20a when planarly viewing the fuel cell 20a (when viewing in the z direction).

The exhaust opening 11c2 is provided to the second combustion chamber 11a2. The exhaust opening 11c2 discharges exhaust gas including air electrode exhaust gas and fuel electrode exhaust gas discharged from the fuel cell 20b to the outside of the second combustion chamber 11a2. The exhaust gas discharged from the exhaust opening 11c2 passes through a combustion chamber external heat exchanger 54b, which is located outside the combustion chamber 11, and is discharged to the outside of the solid oxide fuel cell module 1.

As shown in FIG. 2, the exhaust opening 11c2 is provided in the inner surface on the x2 side of the second combustion chamber 11a2. The exhaust opening 11c2 is opened to the side opposite to the direction of discharging exhaust gas (the x2 side) at the second exhaust ports 43a of the fuel cell 20b when planarly viewing the fuel cell 20b (when viewing in the z direction).

The first combustion chamber 11a1 is provided with an exhaust channel 11b1 that connects both the first exhaust ports 53a and the second exhaust ports 43a of the fuel cell 20a with the first exhaust opening 11c1. The exhaust channel 11b1 is a path partially provided in the space of the first combustion chamber 11a1.

The exhaust channel 11b1 is provided such that at least part of the oxidant gas preheater 17a is located above the exhaust channel 11b1 or faces the exhaust channel 11b1. More specifically, the exhaust channel 11b1 according to the present embodiment is provided such that at least part of the oxidant gas preheater 17a is located above the exhaust channel 11b1.

The second combustion chamber 11a2 is provided with an exhaust channel 11b2 that connects both the first exhaust ports 53a and the second exhaust ports 43a of the fuel cell 20b with the second exhaust opening 11c2. The exhaust channel 11b2 is a path partially provided in the space of the second combustion chamber 11a2.

The exhaust channel 11b2 is provided such that at least part of the oxidant gas preheater 17b is located above the exhaust channel 11b2 or faces the exhaust channel 11b2. More specifically, the exhaust channel 11b2 according to the present embodiment is provided such that at least part of the oxidant gas preheater 17b is located above the exhaust channel 11b2.

Location of First and Second Power Generation Units 2a and 2b

Location of the first and second power generation units 2a and 2b is described next with reference mainly to FIG. 2.

The first and second power generation units 2a and 2b are located such that the fuel cell 20a and the oxidant gas preheater 17a are adjacent to each other and the fuel cell 20b and the oxidant gas preheater 17b are adjacent to each other.

More specifically, the fuel cell 20a and the fuel cell 20b are initially located so as to be overlapped with each other when viewed in the x direction. The fuel cell 20a of the first power generation unit 2a is located on the x2 side in the x direction (first direction) with respect to the fuel cell 20b of the second power generation unit 2b.

The oxidant gas preheater 17a connected to the fuel cell 20a is led out of the combustion chamber 11a1 by way of the inside of the combustion chamber, on the y1 side in the y direction, of the fuel cell 20b. The oxidant gas preheater 17a and the fuel cell 20b are thus adjacent to each other in the y direction (second direction) perpendicular to the x direction.

The oxidant gas preheater 17b connected to the fuel cell 20b is led out of the combustion chamber 11a2 by way of the inside of the combustion chamber, on the y2 side in the y direction, of the fuel cell 20b. The oxidant gas preheater 17b and the fuel cell 20a are thus adjacent to each other in the y direction (second direction) perpendicular to the x direction.

The partition member 22 partitions a region including the fuel cell 20a in the combustion chamber 11 and a region including the fuel cell 20b in the combustion chamber 11. The partition member 22 also partitions the region including the fuel cell 20a in the combustion chamber 11 and a region including the oxidant gas preheater 17b connected to the fuel cell 20*b* in the combustion chamber 11. The partition member 22 also partitions the region including the fuel cell 20*b* in the combustion chamber 11 and a region including the oxidant gas preheater 17*a* connected to the fuel cell 20*a* in the combustion chamber 11.

The partition member 22 is thus provided in the combustion chamber 11, at least between the fuel cell 20*a* and the fuel cell 20*b*, between the fuel cell 20*a* and the oxidant gas preheater 17*b*, and between the fuel cell 20*b* and the oxidant gas preheater 17*a*.

Power Generation Mode at Solid Oxide Fuel Cell Module 1

Described next is a power generation mode at the solid oxide fuel cell module 1 according to the present embodiment.

As shown in FIG. 1, the fuel gas channels 12*a* and 12*b* are supplied with unreformed raw fuel gas. Meanwhile, the reforming water channels 15*a* and 15*b* are supplied with reforming water. The reforming water vaporizes at vaporizers 55*a* and 55*b*, which are provided on the reforming water channels 15*a* and 15*b* in the combustion chambers 11*a*1 and 11*a*2, into vapor. The reformers 14*a* and 14*b* are supplied with this vapor and raw fuel gas.

At the reformers 14*a* and 14*b*, the raw fuel gas is reformed by the vapor, and reformed fuel gas is generated. The reformed fuel gas is further heated by the fuel gas preheaters 16*a* and 16*b*. The reformed fuel gas thus heated is supplied to the fuel cells 20*a* and 20*b*.

It is noted that "fuel gas" in the present invention collectively means raw fuel gas and reformed fuel gas. In other words, fuel gas includes raw fuel gas and reformed fuel gas.

The oxidant gas channels 13*a* and 13*b* are supplied with oxidant gas such as oxygen and air. The oxidant gas is heated at the combustion chamber external heat exchangers 54*a* and 54*b* and at the oxidant gas preheaters 17*a* and 17*b* and is then supplied to the fuel cells 20*a* and 20*b*.

The fuel cells 20*a* and 20*b* generate power from the reformed fuel gas and the oxidant gas thus supplied. Fuel electrode exhaust gas, which is reformed fuel gas having been used for power generation at the fuel cells 20*a* and 20*b*, is discharged from the fuel cells 20*a* and 20*b* through the second exhaust ports 43*a* of the fuel cells 20*a* and 20*b*. Meanwhile, air electrode exhaust gas, which is oxidant gas having been used for power generation at the fuel cells 20*a* and 20*b*, is discharged from the fuel cells 20*a* and 20*b* through the first exhaust ports 53*a* of the fuel cells 20*a* and 20*b*.

The fuel electrode exhaust gas and the air electrode exhaust gas are discharged from the combustion chambers 11*a*1 and 11*a*2 through the exhaust channels 11*b*1 and 11*b*2, and are further discharged from the solid oxide fuel cell module 1 through the combustion chamber external heat exchangers 54*a* and 54*b*.

The fuel electrode exhaust gas includes carbon monoxide and the like. Meanwhile, the air electrode exhaust gas includes oxygen. Accordingly, when the fuel electrode exhaust gas and the air electrode exhaust gas are mixed together in the combustion chambers 11*a*1 and 11*a*2 having high temperature, respectively, the fuel electrode exhaust gas is combusted perfectly. There is generated combustion gas in the respective combustion chambers. Exhaust gas, which is discharged from the combustion chambers 11*a*1 and 11*a*2 through the exhaust channels 11*b*1 and 11*b*2, thus includes the combustion gas and components not used for generation of the combustion gas in the air electrode exhaust gas.

It is noted that "exhaust gas" is assumed to include fuel electrode exhaust gas, air electrode exhaust gas, and combustion gas.

In the present embodiment, regarding the first and second power generation units 2*a* and 2*b*, the fuel cell 20*a* and the oxidant gas preheater 17*b* connected to the fuel cell 20*b* are adjacent to each other in the y direction, whereas the fuel cell 20*b* and the oxidant gas preheater 17*a* connected to the fuel cell 20*a* are adjacent to each other in the y direction. The fuel cell module 1 can be thus reduced in size in comparison to a case where large fuel cells are located adjacent to each other in the y direction, for example.

Particularly, the fuel cells 20*a* and 20*b* according to the present embodiment are located at different positions in the x direction and are overlapped with each other when viewed in the x direction. The solid oxide fuel cell module 1 can be thus further reduced in size.

In this simple configuration in terms of location, the fuel cell 20*a* and the oxidant gas preheater 17*b* through which oxidant gas at low temperature passes are adjacent to each other. Furthermore, the fuel cell 20*b* and the oxidant gas preheater 17*a* through which oxidant gas at low temperature passes are adjacent to each other. The fuel cells 20*a* and 20*b* are likely to be cooled by the oxidant gas preheaters 17*b* and 17*a* and be decreased in temperature, respectively. Furthermore, portions of the fuel cells 20*a* and 20*b* close to the oxidant gas preheaters 17*a* and 17*b* are likely to be lower in temperature than remaining portions, to cause variation in temperature at the fuel cells 20*a* and 20*b*. This may lead to unstable power generation at the fuel cells 20*a* and 20*b*.

According to the present embodiment, the partition member 22 partitions the combustion chamber 11 into a region including one of the fuel cells 20*a* and 20*b* and a region including the oxidant gas preheater 17*a* or 17*b* connected to the other one of the fuel cells 20*a* and 20*b*. This configuration can inhibit heat exchange between the fuel cells 20*a* and 20*b* and the oxidant gas preheaters 17*b* and 17*a* located adjacent thereto. The fuel cells 20*a* and 20*b* can be thus inhibited from decrease in temperature and variation in temperature. This leads to stabilized power generation by the fuel cells 20*a* and 20*b*.

As described above, the present embodiment enables both reduction in size and stabilized power generation of the solid oxide fuel cell module 1.

The partition member 22 is preferred to be excellent in heat insulation in terms of further stabilization of power generation by the fuel cells 20*a* and 20*b*. The partition member 22 is thus preferably made of a heat insulator.

Furthermore, the oxidant gas preheaters 17*a* and 17*b* are provided according to the present embodiment so as to be partially located above the exhaust channels 11*b*1 and 11*b*2 or so as to partially face the exhaust channels 11*b*1 and 11*b*2. In the exhaust channels 11*b*1 and 11*b*2, the reformers 14*a* and 14*b* and the fuel gas preheaters 16*a* and 16*b* are provided so as to be at least partially located above the exhaust channels 11*b*1 and 11*b*2 or so as to at least partially face the exhaust channels 11*b*1 and 11*b*2. Exhaust gas, which has been used for power generation and has been combusted to be high in temperature, circulates in the exhaust channels 11*b*1 and 11*b*2 respectively due to provision of the partition member 22. Accordingly heated are at least part of the oxidant gas preheaters 17*a* and 17*b*, the reformers 14*a* and 14*b*, and the fuel gas preheaters 16*a* and 16*b*. This configuration enables effective usage of heat of exhaust gas. Accordingly achieved is high energy efficiency.

Moreover, the oxidant gas preheaters 17*a* and 17*b*, the reformers 14*a* and 14*b*, and the fuel gas preheaters 16*a* and 16*b* can be increased in temperature. The fuel cells 20*a* and 20*b* are thus less likely to be cooled by the oxidant gas preheaters 17*a* and 17*b*, the reformers 14*a* and 14*b*, and the fuel gas preheaters 16a and 16b. This leads to further stabilized power generation by the fuel cells 20a and 20b.

According to the present embodiment, both the fuel electrode exhaust gas and the air electrode exhaust gas are discharged to the combustion chambers 11a1 and 11a2, and mixed together halfway in the exhaust channels 11b1 and 11b2 to be combusted. The exhaust gas flowing through the exhaust channels 11b1 and 11b2 is thus high in temperature. The exhaust gas is thus capable of more efficiently heating the reformers 14a and 14b, the fuel gas preheaters 16a and 16b, and the oxidant gas preheaters 17a and 17b. This achieves higher energy efficiency.

Moreover, the partition member 22 restricts flow of the exhaust gas, so that the fuel electrode exhaust gas and the air electrode exhaust gas can be reliably mixed together to be combusted in the exhaust channels 11b1 and 11b2. This configuration more effectively inhibits discharge of carbon monoxide from the solid oxide fuel cell module 1.

Provision of the partition member 22 also enables the air electrode exhaust gas to flow along the partition member 22 and be mixed with the fuel electrode exhaust gas at appropriate positions. This configuration locates combustion positions near the reformers and the preheaters, to which more heat is desirably applied, and improves heat utilization of the exhaust gas.

The above embodiment exemplifies the solid oxide fuel cell module 1 including the two power generation units 2a and 2b. Nevertheless, the present invention is not particularly limited in terms of the number of power generation units included in the solid oxide fuel cell module as long as there are provided at least two power generation units. The solid oxide fuel cell module according to the present invention can alternatively include at least three, e.g. four, power generation units.

DESCRIPTION OF REFERENCE SYMBOLS

1 . . . Solid oxide fuel cell module
2a . . . First power generation unit
2b . . . Second power generation unit
10 . . . Heat insulator
11 . . . Combustion chamber
11a1 . . . First combustion chamber
11a2 . . . Second combustion chamber
11c1 . . . First exhaust opening
11c2 . . . Second exhaust opening
11b1, 11b2 . . . Exhaust channel
12a, 12b . . . Fuel gas channel
13a, 13b . . . Oxidant gas channel
14a, 14b . . . Reformer
15a, 15b . . . Reforming water channel
16a, 16b . . . Fuel gas preheater
17a, 17b . . . Oxidant gas preheater
20a, 20b . . . Fuel cell
21 . . . Power generation cell
22 . . . Partition member
40 . . . Second separator
41 . . . Second separator main body
42 . . . Second channel forming member
43 . . . Fuel gas supply channel
43a . . . Second exhaust port
44 . . . Fuel gas manifold
45 . . . Oxidant gas manifold
46 . . . Power generation element
47 . . . Solid oxide electrolyte layer
48 . . . Fuel electrode layer
48a . . . Fuel electrode
49 . . . Air electrode layer
49a . . . Air electrode
50 . . . First separator
51 . . . First separator main body
51a . . . Via hole electrode
52 . . . First channel forming member
53 . . . Oxidant gas supply channel
53a . . . First exhaust port
54a, 54b . . . Combustion chamber external heat exchanger
55a, 55b . . . Vaporizer

The invention claimed is:

1. A fuel cell module comprising:
a combustion chamber; and
a plurality of power generation units;
each power generation unit comprising:
 a fuel cell located in the combustion chamber;
 a fuel gas channel connected to the fuel cell;
 an oxidant gas channel connected to the fuel cell;
 an oxidant gas preheater disposed in a portion of the oxidant gas channel in the combustion chamber; and
a partition member that partitions the combustion chamber into a region comprising a first fuel cell of a first power generation unit and a region comprising a second fuel cell of a second power generation unit,
wherein the partition member includes a first portion extending in a first direction, a second portion extending from the first portion in a second direction that is perpendicular to the first direction, and a third portion extending from the second portion in the first direction, and
wherein the plurality of power generation units are disposed such that the first fuel cell and the second fuel cell are respectively disposed adjacent to opposite sides of the second portion of the partition member, the first fuel cell and the oxidant gas preheater connected to the second fuel cell are respectively disposed adjacent to opposites sides of the first portion of the partition member, and the second fuel cell and the oxidant gas preheater connected to the first fuel cell are respectively disposed adjacent to opposite sides of the third portion of the partition member.

2. The fuel cell module according to claim 1, wherein the first fuel cell of the first power generation unit and the second fuel cell of the second power generation unit are disposed so as to overlap each other when viewed in the first direction.

3. The fuel cell module according to claim 2, wherein the partition member is a heat insulator.

4. The fuel cell module according to claim to 3, wherein:
the fuel cell of each power generation unit comprises a first exhaust port for discharging air electrode exhaust gas that is oxidant gas that has already been used for power generation, and a second exhaust port for discharging fuel electrode exhaust gas that has already been used for power generation; and
wherein the combustion chamber comprises:
 an exhaust opening for discharging exhaust gas discharged from the fuel cell to an outside of the combustion chamber, and
 an exhaust channel connecting the first and second exhaust ports and the exhaust opening; and
 the exhaust channel is disposed such that at least part of the oxidant gas preheater is disposed between the exhaust channel and the partition member or faces the exhaust channel.

5. The fuel cell module according to claim 1, wherein the partition member is a heat insulator.

6. The fuel cell module according to claim to 5, wherein:
the fuel cell of each power generation unit has a first exhaust port for discharging air electrode exhaust gas that is oxidant gas that has already been used for power generation, and a second exhaust port for discharging fuel electrode exhaust gas that has already been used for power generation;
the combustion chamber comprises:
- an exhaust opening for discharging exhaust gas discharged from the fuel cell to an outside of the combustion chamber, and
- an exhaust channel connecting the first and second exhaust ports and the exhaust opening; and
- the exhaust channel is disposed such that at least part of the oxidant gas preheater is disposed between the exhaust channel and the partition or faces the exhaust channel.

7. The fuel cell module according to claim 1, wherein the partition member is a heat insulator.

8. The fuel cell module according to claim to 7, wherein:
the fuel cell of each power generation unit has a first exhaust port for discharging air electrode exhaust gas that is oxidant gas that has already been used for power generation, and a second exhaust port for discharging fuel electrode exhaust gas that has already been used for power generation;
the combustion chamber comprises:
- an exhaust opening for discharging exhaust gas discharged from the fuel cell to an outside of the combustion chamber, and
- an exhaust channel connecting the first and second exhaust ports and the exhaust opening; and
- the exhaust channel is disposed such that at least part of the oxidant gas preheater is disposed between the exhaust channel and the partition or faces the exhaust channel.

* * * * *